(12) United States Patent
Bajpai et al.

(10) Patent No.: US 10,326,788 B1
(45) Date of Patent: Jun. 18, 2019

(54) SYSTEMS AND METHODS FOR IDENTIFYING SUSPICIOUS CONTROLLER AREA NETWORK MESSAGES

(71) Applicant: Symantec Corporation, Mountain View, CA (US)

(72) Inventors: Vishal Bajpai, Los Altos, CA (US); Michael Pukish, Santa Clara, CA (US); Venkatesh Chakravarthy, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 281 days.

(21) Appl. No.: 15/587,762

(22) Filed: May 5, 2017

(51) Int. Cl.
*H04L 29/06* (2006.01)
*H04L 12/40* (2006.01)

(52) U.S. Cl.
CPC .......... *H04L 63/1433* (2013.01); *H04L 12/40* (2013.01); *H04L 63/145* (2013.01); *H04L 63/1416* (2013.01); *H04L 2012/40215* (2013.01)

(58) Field of Classification Search
None
See application file for complete search history.

(56) References Cited

U.S. PATENT DOCUMENTS

| | | | |
|---|---|---|---|
| 7,015,811 B2 | 3/2006 | Decker et al. | |
| 7,475,124 B2 | 1/2009 | Jiang et al. | |
| 7,673,074 B1 | 3/2010 | Sebastian et al. | |
| 7,788,723 B2 * | 8/2010 | Huddleston | G06F 21/554 |
| | | | 713/188 |

(Continued)

FOREIGN PATENT DOCUMENTS

| | | |
|---|---|---|
| CN | 102571469 A | 7/2012 |
| CN | 102893289 A | 1/2013 |
| EP | 2515250 A1 | 10/2012 |

OTHER PUBLICATIONS

Xiaodong, Ni; Yanjun, Zhang. Determining Message Delivery Delay of Controller Area Networks. 2002 IEEE Region 10 Conference on Computers, Communications, Control and Power Engineering. TENCOM '02 Proceedings. https://ieeexplore.ieee.org/stamp/stamp.jsp?tp=&arnumber=1180235 (Year: 2002).*

(Continued)

*Primary Examiner* — Jeremiah L Avery

(74) *Attorney, Agent, or Firm* — FisherBroyles, LLP

(57) ABSTRACT

The disclosed computer-implemented method for identifying suspicious controller area network messages may include (i) monitoring, for a predetermined period of time, messages sent by an electronic control unit that comprise a controller area network identifier for at least one controller area network device, (ii) observing, in the messages, a set of corresponding patterns that each comprise a content pattern and a timing pattern, (v) detecting a message that comprises the controller area network identifier, wherein a content pattern of the message and a timing pattern of the message do not match any pair of corresponding patterns in the set of corresponding patterns, and (vi) determining that the message is suspicious based at least in part on content pattern of the message and the timing pattern of the message not matching any pair of corresponding patterns in the set. Various other methods, systems, and computer-readable media are also disclosed.

20 Claims, 7 Drawing Sheets

(56) References Cited

U.S. PATENT DOCUMENTS

| | | | |
|---|---|---|---|
| 7,861,300 B2 | 12/2010 | Arnold et al. | |
| 8,104,090 B1 | 1/2012 | Pavlyushchik | |
| 8,126,891 B2 | 2/2012 | Laxman et al. | |
| 8,230,505 B1* | 7/2012 | Ahrens | G06Q 10/02 726/23 |
| 8,341,745 B1 | 12/2012 | Chau et al. | |
| 8,544,087 B1 | 9/2013 | Eskin et al. | |
| 8,566,938 B1 | 10/2013 | Prakash et al. | |
| 8,925,037 B2 | 12/2014 | Marino et al. | |
| 8,973,133 B1 | 3/2015 | Cooley | |
| 9,053,516 B2 | 6/2015 | Stempora | |
| 9,088,560 B1 | 7/2015 | Newstadt et al. | |
| 9,141,790 B2 | 9/2015 | Roundy et al. | |
| 9,148,441 B1 | 9/2015 | Tamersoy et al. | |
| 9,166,997 B1 | 10/2015 | Guo et al. | |
| 9,256,739 B1 | 2/2016 | Roundy et al. | |
| 9,332,030 B1 | 5/2016 | Pereira | |
| 9,384,066 B1 | 7/2016 | Leita et al. | |
| 9,473,380 B1 | 10/2016 | Bermudez et al. | |
| 9,529,990 B2 | 12/2016 | Newstadt et al. | |
| 9,582,669 B1 | 2/2017 | Shen et al. | |
| 2002/0124089 A1 | 9/2002 | Aiken et al. | |
| 2004/0044771 A1 | 3/2004 | Allred et al. | |
| 2004/0059822 A1 | 3/2004 | Jiang et al. | |
| 2005/0030969 A1 | 2/2005 | Fredriksson | |
| 2005/0138413 A1 | 6/2005 | Lippmann et al. | |
| 2005/0262559 A1* | 11/2005 | Huddleston | G06F 21/53 726/22 |
| 2005/0262565 A1* | 11/2005 | Gassoway | G06F 21/554 726/23 |
| 2006/0095573 A1 | 5/2006 | Carle et al. | |
| 2006/0236374 A1 | 10/2006 | Hartman | |
| 2007/0280106 A1* | 12/2007 | Lund | H04L 63/1408 370/230 |
| 2008/0088408 A1 | 4/2008 | Backman | |
| 2008/0134327 A1 | 6/2008 | Bharrat et al. | |
| 2009/0144308 A1 | 6/2009 | Huie et al. | |
| 2009/0157365 A1 | 6/2009 | Higuchi et al. | |
| 2010/0186088 A1 | 7/2010 | Banerjee et al. | |
| 2010/0192226 A1 | 7/2010 | Noel et al. | |
| 2010/0235879 A1 | 9/2010 | Burnside et al. | |
| 2011/0019774 A1 | 1/2011 | Furuta | |
| 2011/0047620 A1 | 2/2011 | Mahaffey et al. | |
| 2011/0083180 A1 | 4/2011 | Mashevsky et al. | |
| 2011/0302656 A1 | 12/2011 | El-Moussa | |
| 2011/0314546 A1 | 12/2011 | Aziz et al. | |
| 2011/0320617 A1 | 12/2011 | Annamalaisami et al. | |
| 2012/0144468 A1 | 6/2012 | Pratt et al. | |
| 2012/0233683 A1 | 9/2012 | Ibrahim et al. | |
| 2013/0031037 A1 | 1/2013 | Brandt et al. | |
| 2013/0042294 A1 | 2/2013 | Colvin et al. | |
| 2013/0212659 A1 | 8/2013 | Maher et al. | |
| 2013/0333032 A1 | 12/2013 | Delatorre et al. | |
| 2014/0226664 A1 | 8/2014 | Chen et al. | |
| 2014/0258379 A1 | 9/2014 | L'Heureux et al. | |
| 2014/0330977 A1 | 11/2014 | van Bemmel | |
| 2014/0365646 A1 | 12/2014 | Xiong | |
| 2015/0113638 A1 | 4/2015 | Valasek et al. | |
| 2015/0150124 A1 | 5/2015 | Zhang et al. | |
| 2015/0261655 A1 | 9/2015 | Versteeg et al. | |
| 2015/0281047 A1 | 10/2015 | Raju et al. | |
| 2016/0173507 A1* | 6/2016 | Avrahami | G06F 21/563 726/23 |
| 2016/0261482 A1 | 9/2016 | Mixer et al. | |
| 2016/0315949 A1* | 10/2016 | Falk | H04L 63/145 |
| 2017/0034205 A1* | 2/2017 | Canedo | H04L 63/1416 |
| 2017/0118234 A1 | 4/2017 | Arora et al. | |
| 2018/0205754 A1* | 7/2018 | North | H04L 63/1433 |

OTHER PUBLICATIONS

Wu, Yujing et al. Security Protocol for Controller Area Network Using ECANDC Compression Algorithm. 2016 IEEE International Conference on Signal Processing, Communications and Computing (ICSPCC). https://ieeexplore.ieee.org/stamp/stamp.jsp?tp=&arnumber=7753631 (Year: 2016).*

Mubeen, Saad et al. Extending Worst Case Response-Time Analysis for Mixed Messages in Controller Area Network With Priority and FIFO Queues. IEEE Access, vol. 2. https://ieeexplore.ieee.org/stamp/stamp.jsp?tp=&arnumber=6803860 (Year: 2014).*

Mahoney, Network traffic anomaly detection based on packet bytes, Proceedings of the 2003 ACM symposium on Applied computing, pp. 346-350, Mar. 9, 2003.

Balthrop et al., Revisiting LISYS: Parameters and Normal Behavior, Proceedings of the 2002 Congress on Evolutionary Computation, pp. 1045-1050, May 12, 2002.

Lee et al., Data mining approaches for intrusion detection, Proceedings of the 7th conference on USENIX Security Symposium—vol. 7, p. 6, Jan. 26, 1998.

Clifton et al., Developing custom intrusion detection filters using data mining, MILCOM 2000. 21st Century Military Communications Conference Proceedings, vol. 1, pp. 440-443, Oct. 22, 2000.

Bloedorn et al., Data Mining for Improving Intrusion Detection, http://www.mitre.org/sites/default/files/pdf/bloedorn_spss.pdf, Sep. 18, 2015.

Lee et al., Information-theoretic measures for anomaly detection, 2001 IEEE Symposium on Security and Privacy, pp. 130-143, May 13, 2001.

Yang et al., Anomaly detection and diagnosis in grid environments, Proceedings of the 2007 ACM/IEEE conference on Supercomputing, p. 33, Nov. 10, 2007.

Wang et al., Anomalous Payload-Based Network Intrusion Detection, http://www.covert.io/research-papers/security/PAYL%20-%20Anomalous%20Payload-based%20Network%20Intrusion%20Detection.pdf, as accessed Sep. 29, 2015, Seventh International Workshop on Recent Advances in Intrusion Detection, pp. 203-222, Sep. 15, 2004.

Dussel et al., Cyber-Critical Infrastructure Protection Using Real-Time Payload-Based Anomaly Detection, 4th International Workshop on Critical Information Infrastructures Security, pp. 85-97, Sep. 30, 2009.

Tongaonkar et al., Towards self adaptive network traffic classification, Computer Communications, vol. 56, pp. 35-46, Feb. 1, 2015.

Bermudez et al., Automatic protocol field inference for deeper protocol understanding, IFIP Networking Conference (IFIP Networking), 2015, pp. 1-9, May 20, 2015.

Pukish et al., U.S. Appl. No. 15/194,337, filed Jun. 27, 2016.

Taylor et al., Frequency-based anomaly detection for the automotive CAN bus, 2015 World Congress on Industrial Control Systems Security (WCICS), pp. 45-49, Dec. 14, 2015.

Theissler, Anomaly detection in recordings from in-vehicle networks.pdf, Big Data Applications and Principles, First International Workshop, BIGDAP 2014, Madrid, Spain, Sep. 11, 2014.

Muter et al., A structured approach to anomaly detection for in-vehicle networks, 2010 Sixth International Conference on Information Assurance and Security (IAS), Atlanta, GA, pp. 92-98, Aug. 23, 2010.

Kleberger; Security Aspects of the In-Vehicle Network in the Connected Car; Intelligent Vehicles Symposium (IV), 2011 IEEE, Baden-Baden, Germany, reference: pp. 528-533, Jun. 5-9, 2011.

Muter; Entropy-based anomaly detection for in-vehicle networks; 2011 IEEE Intelligent Vehicles Symposium (IV), DOI: 10.1109/IVS.2011.5940552, Baden-Baden, Germany, reference: pp. 1110-1115, Jun. 5-9, 2011.

Bayer; Automotive Security Testing—The Digital Crash Test; http://www.sia.fr/images/images/Image/Evenements/2014/CESA/available%20papers/09_Bayer_Escrypt.pdf, as accessed Feb. 9, 2015; 3rd CESA Automotive Electronics Congress (CESA 3.0), Paris, France, Dec. 3-4, 2014.

Ben Othmane; Towards Extended Safety in Connected Vehicles; Proceedings of the 16th International IEEE Annual Conference on Intelligent Transportation Systems (ITSC 2013), The Hague, The Netherlands, Oct. 6-9, 2013.

Bourns Type 6002 Non-contacting Steering Angle Sensor; http://www.we-conect.com/cms/media/uploads/events/415/dokurnente/

(56) References Cited

OTHER PUBLICATIONS

Bourns_-_Non-Contacting_Steering_Angle_Sensor_Type_6002. pdf, as accessed Aug. 29, 2014, on or before Aug. 29, 2014.
CAN protocol specification; http://www.can-cia.org/index.php?id=164, as accessed Aug. 29, 2014, Oct. 17, 2010.
Controller Area Network (CAN) Overview; http://www.ni.com/white-paper/2732/en/, as accessed Aug. 29, 2014; National Instruments Corporation, Aug. 1, 2014.
Driver Feedback; https://play.google.com/store/apps/details?id=com.statefarm.driverfeedback, as accessed Aug. 29, 2014; State Farm Insurance, Android Apps on Google Play, Jun. 2, 2013.
Electronic control unit; https://en.wikipedia.org/wiki/Electronic_control_unit, as accessed Feb. 9, 2015; Wikipedia, Jul. 28, 2004.
EMI/ESD Protection Solutions for the CAN Bus; http://www.onsemi.com/pub_link/Collateral/AND8169-D.PDF, as accessed Aug. 29, 2014; Publication Order No. AND8169/D, on Semiconductor, Semiconductor Components Industries, LLC, Jun. 2014—Rev. 2.
Emulation; https://en.wikipedia.org/wiki/Emulation, as accessed Feb. 9, 2015; Wikipedia,Dec. 3, 2003.
FlexRay Automotive Communication Bus Overview; http://www.ni.com/white-paper/3352/en/, as accessed Aug. 29, 2014; National Instruments Corporation, Aug. 21, 2009.
Hardware emulation; https://en.wikipedia.org/wiki/Hardware_emulation, as accessed Feb. 9, 2015; Wikipedia, Sep. 13, 2006.
Koscher; Experimental Security Analysis of a Modern Automobile; http://www.autosec.org/pubs/cars-oakland2010.pdf, as accessed Feb. 9, 2015; 2010 IEEE Symposium on Security and Privacy, 2010.
Lepkowski; EMI/ESD protection solutions for the CAN bus; http://www.can-cia.org/fileadmin/cia/files/icc/10/cia_paper_lepkowski.pdf, as accessed Aug. 29, 2014; iCC 2005, CAN in Automation, 2005.
Miller; A Survey of Remote Automotive Attack Surfaces; http://www.ioactive.com/pdfs/Remote_Automotive_Attack_Surfaces.pdf, as accessed Aug. 29, 2014; Black Hat USA 2014, Las Vegas, NV, Aug. 2-7, 2014.
Nathan Evans, et al; Systems and Methods for Detecting Anomalous Messages in Automobile Networks; U.S. Appl. No. 14/525,792, filed Oct. 28, 2014.
Nathan Evans, et al; Systems and Methods for Evaluating Electronic Control Units Within Vehicle Emulations; U.S. Appl. No. 14/671,036, filed Mar. 27, 2015.
REGEV; Automotive Ethernet Security Testing; http://standards.ieee.org/events/automotive/2014/20_Automotive_Ethernet_Security_Testing.pdf, as accessed Feb. 9, 2015, 2014.
Snapshot; https://www.progressive.com/auto/snapshot/, as accessed Aug. 29, 2014; Progressive Casualty Insurance Company, Mar. 8, 2013.
Vehicle bus; https://en.wikipedia.org/wiki/Vehicle_bus, as accessed Feb. 9, 2015; Wikipedia, May 12, 2005.
Volvo tests Cloud-based V2V ice warning concept; http://telematicsnews.info/2014/03/19/volvo-tests-cloud-based-v2v-ice-warning-sharing_m5202/, as accessed Aug. 29, 2014; Telematics News, Mar. 19, 2014.
Wolf; Security in Automotive Bus Systems; http://www.weika.eu/papers/WolfEtAl_SecureBus.pdf, as accessed Aug. 29, 2014, 2004.
Yun Shen, et al; Systems and Methods for Detecting Discrepancies in Automobile-Network Data; U.S. Appl. No. 14/525,715, filed Oct. 28, 2014.
Bajpai, et al; Systems and Methods for Detecting Suspicious Microcontroller Messages; U.S. Appl. No. 15/143,284, filed Apr. 29, 2016.
Michael Pukish, et al; Systems and Methods for Detecting Transactional Message Sequences That Are Obscured in Multicast Communications; U.S. Appl. No. 15/194,337, filed Jun. 27, 2016.
Vishal Bajpai et al.; System and Method for Identifying an Invalid Packet on a Controller Area Network (CAN) Bus; U.S. Appl. No. 15/056,864, filed Feb. 29, 2016.
Adam Glick, et al.; Systems and Methods for User-Directed Malware Remediation; U.S. Appl. No. 13/419,360, filed Mar. 13, 2012.
Carey Nachenberg, et al.; Systems and Methods for Neutralizing File-Format-Specific Exploits Included Within Files Contained Within Electronic Communications; U.S. Appl. No. 13/418,332, filed Mar. 12, 2012.
Leylya Yumer, et al.; Systems and Methods for Analyzing Zero-Day Attacks; U.S. Appl. No. 13/901,977, filed May 24, 2013.
Kyumin Lee, et al.; Content-Driven Detection of Campaigns in Social Media; CIKM'11; Oct. 24-28, 2011; ACM; Glasgow, Scotland, UK; http://faculty.cs.tamu.edu/caverlee/pubs/lee11cikm.pdf, as accessed Aug. 8, 2013.
Monowar H. Bhuyan, et al.; AOCD: An Adaptive Outlier Based Coordinated Scan Detection Approach; International Journal of Network Security; Nov. 2012; pp. 339-351; vol. 14, No. 6; http://www.cs.uccs.edu/~jkalita/papers/2012/BhuyanMonowarIJNS2012.pdf, as accessed Aug. 8, 2013.
William Eberle, et al., Graph-based approaches to insider threat detection; CSIIRW '09 Proceedings of the 5th Annual Workshop on Cyber Security and Information Intelligence Research: Cyber Security and Information Intelligence Challenges and Strategies; 2009; Article No. 44; ACM; http://dl.acm.org/citation.cfm?id=1558658, as accessed Aug. 8, 2013.
Splunk, Inc.; Detecting Advanced Persistent Threats—Using Splunk for APT; Jan. 4, 2012; Tech Brief; http://www.splunk.com/web_assets/pdfs/secure/Splunk_for_APT_Tech_Brief.pdf, as accessed Aug. 8, 2013.
Triumfant, Inc.; Detecting the Advanced Persistent Threat; Nov. 30, 2010; www.triumfant.com/advanced_persistent_threat.asp, as accessed Aug. 8, 2013.
EMC Corporation; Advanced Persistent Threat (APT) and Rootkit Detection; 2012; http://www.siliciumsecurity.com/advanced-persistent-threats-and-rootkits-detection/, as accessed Aug. 8, 2013.
Fanglu Guo, et al; Systems and Methods for Reducing False Positives When Using Event-Correlation Graphs to Detect Attacks on Computing Systems; U.S. Appl. No. 14/031,044, filed Sep. 19, 2013.
Colombe, Jeffrey B., et al., "Statistical profiling and visualization for detection of malicious insider attacks on computer networks", http://dl.acm.org/citation.cfm?id=1029231, as accessed Nov. 13, 2013, VizSEC/DMSEC '04 Proceedings of the 2004 ACM workshop on Visualization and data mining for computer security, ACM, New York, NY, (2004), 138-142.
Wang, Wei et al., "Diffusion and graph spectral methods for network forensic analysis", http://dl.acm.org/citation.cfm?id=1278956, as accessed Nov. 13, 2013, NSPW '06 Proceedings of the 2006 workshop on New security paradigms, ACM, New York, NY, (2006), 99-106.
Julisch, Klaus "Clustering intrusion detection alarms to support root cause analysis", http://dl.acm.org/citation.cfm?id=950192, as accessed Nov. 13, 2013, ACM Transactions on Information and System Security (TISSEC), vol. 6, Issue 4, ACM, New York, NY, (Nov. 2003), 443-471.
Treinen, James J., et al., "A framework for the application of association rule mining in large intrusion detection infrastructures", http://dl.acm.org/citation.cfm?id=2166375, as accessed Nov. 13, 2013, RAID'06 Proceedings of the 9th international conference on Recent Advances in Intrusion Detection, Springer-Verlag Berlin, Heidelberg, (2006), 1-18.
Gu, Guofei et al., "BotHunter: detecting malware infection through IDS-driven dialog correlation", http://dl.acm.org/citation.cfm?id=1362915, as accessed Nov. 13, 2013, SS'07 Proceedings of 16th USENIX Security Symposium on USENIX Security Symposium, Article No. 12, USENIX Association, Berkeley, CA, (2007).
Valdes, Alfonso et al., "Probabilistic Alert Correlation", http://dl.acm.org/citation.cfm?id=670734, as accessed Nov. 13, 2013, RAID '00 Proceedings of the 4th International Symposium on Recent Advances in Intrusion Detection, Springer-Verlag, London, UK, (2001), 54-68.
Alsubhi, Khalid et al., "FuzMet: a fuzzy-logic based alert prioritization engine for intrusion detection systems", http://dl.acm.org/citation.cfm?id=2344711, as accessed Nov. 13, 2013, International Journal of Network Management, vol. 22 Issue 4, John Wiley & Sons, Inc., New York, NY, (Jul. 2012).

(56) References Cited

OTHER PUBLICATIONS

Zamlot, Loai et al., "Prioritizing intrusion analysis using Dempster-Shafer theory", http://dl.acm.org/citation.cfm?id=2046694, as accessed Nov. 13, 2013, AISec '11 Proceedings of the 4th ACM workshop on Security and artificial intelligence, ACM, New York, NY, (2011), 59-70.

Oliner, Adam J., et al., "Community epidemic detection using time-correlated anomalies", http://dl.acm.org/citation.cfm?id=1894191, as accessed Nov. 13, 2013, RAID'10 Proceedings of the 13th international conference on Recent advances in intrusion detection, Springer-Verlag Berlin, Heidelberg, (2010), 360-381.

Ning, Peng et al., "Constructing attack scenarios through correlation of intrusion alerts", http://reeves-students.csc.ncsu.edu/papers-and-other-stuff/2002-10-ccs-constructing-attack-scenarios-paper.pdf, as accessed Nov. 13, 2013, CCS '02 Proceedings of the 9th ACM conference on Computer and communications security, ACM, Washington, DC, (Nov. 18-22, 2002), 245-254.

Wang, Wei et al., "A Graph Based Approach Toward Network Forensics Analysis", http://dl.acm.org/citation.cfm?id=1410238, as accessed Nov. 13, 2013, ACM Transactions on Information and System Security (TISSEC), vol. 12, Issue 1, Article No. 4, ACM, New York, NY, (Oct. 2008).

Valeur, Fredrik et al., "A Comprehensive Approach to Intrusion Detection Alert Correlation", http://dl.acm.org/citation.cfm?id=1038251, as accessed Nov. 13, 2013, IEEE Transactions on Dependable and Secure Computing, vol. 1, Issue 3, IEEE Computer Society Press, Los Alamitos, CA, (Jul. 2004), 146-169.

Tedesco, Gianni et al., "Real-Time Alert Correlation with Type Graphs", http://dl.acm.org/citation.cfm?id=1496279, as accessed Nov. 13, 2013, ICISS '08 Proceedings of the 4th International Conference on Information Systems Security, Springer-Verlag Berlin, Heidelberg, (2008), 173-187.

Wang, Wei et al., "Network Forensics Analysis with Evidence Graphs", http://www.dfrws.org/2005/proceedings/wang_evidencegraphs.pdf, as accessed Nov. 13, 2013, 2005 Digital Forensic Research Workshop (DFRWS), New Orleans, LA, (2005).

Wang, Ting et al., "Microscopic Social Influence", http://www.cc.gatech.edu/~lingliu/papers/2012/TingWang-SDM2012.pdf, as accessed Nov. 13, 2013, SDM 2012, (2012).

Ugander, Johan et al., "Balanced Label Propagation for Partitioning Massive Graphs", https://people.cam.cornell.edu/~jugander/papers/wsdm13-blp.pdf, as accessed Nov. 13, 2013, WSDM'13, ACM, Rome, Italy, (Feb. 4-8, 2013).

Ayday, Erman et al., "Iterative Trust and Reputation Management Using Belief Propagation", http://www.ece.gatech.edu/research/labs/WCCL/BP_publications/BP-ITRM-journal.pdf, as accessed Nov. 13, 2013, IEEE Transactions on Dependable and Secure Computing, vol. 9, No. 3, IEEE Computer Society, (May/Jun. 2012), 375-386.

Bruce McCorkendale, et al; Systems and Methods for Detecting Malware; U.S. Appl. No. 13/422,702, filed Mar. 16, 2012.

Acar Tamersoy, et al; Systems and Methods for Adjusting Suspiciousness Scores in Event-Correlation Graphs; U.S. Appl. No. 14/138,891, filed Dec. 23, 2013.

Paleari, Roberto et al., "Automatic Generation of Remediation Procedures for Malware Infections", https://www.usenix.org/legacy/event/sec10/tech/full_papers/Paleari.pdf, as accessed Feb. 6, 2014, USENIX Security'10 Proceedings of the 19th USENIX conference on Security, USENIX Association, Berkeley, CA, (2010).

"Combating Advanced Persistent Threats—How to prevent, detect, and remediate APTs", http://www.mcafee.com/us/resources/white-papers/wp-combat-advanced-persist-threats.pdf, as accessed Feb. 6, 2014, McAfee, Inc., Santa Clara, CA, (2011).

"Advanced Persistent Threat (APT) Attack & Zero-Day Protection", http://www.fireeye.com/, as accessed Feb. 6, 2014, FireEye, Inc., (2006).

"Advanced Threat Defense", http://www.fidelissecurity.com/advanced-persistent-threat-protection, as accessed Feb. 6, 2014, General Dynamics Fidelis Cybersecurity Solutions, Inc., (2013).

"Mandiant for Security Operations", https://www.mandiant.com/products/mandiant-platform/security-operations, as accessed Feb. 6, 2014, Mandiant, A FireEye Company, (Mar. 1, 2013).

"Mandiant for Intelligent Response", http://www.mandiant.com/products/mandiant-platform/intelligent-response, as accessed Feb. 6, 2014, Mandiant, A FireEye Company, (Mar. 1, 2013).

"Solera Networks Inc.", http://www.soleranetworks.com/, as accessed Feb. 6, 2014, (Feb. 16, 2005).

"LogRhythm, Inc.", http://www.logrhythm.com/, as accessed Feb. 6, 2014, (Oct. 18, 2000).

Kevin Alejandro Roundy, et al; Systems and Methods for Using Event-Correlation Graphs to Generate Remediation Procedures; U.S. Appl. No. 14/221,703, filed Mar. 21, 2014.

Eberle, William et al., "Insider Threat Detection Using Graph-Bases Approaches", http://www.eecs.wsu.edu/-holder/pubs/EberleCATCH09.pdf, Cybersecurity Applications & Technology Conference for Homeland Security, (Jan. 2009).

Constantin, Lucian, "Attackers used known exploit to steal customer log-in credentials, vBulletin maker says", http://www.networkworid.com/article/2171967/access-control/attackers-used-known-exploit-to-steal-custorner-log-in-credentials--vbulletin-maker-sa.html, IDG News Service, Network World, (Nov. 18, 2013).

"Recovery Manager for Active Directory Forest Edition", http://software.dell.com/documents/recovery-manager-for-active-directory-forest-edition-datasheet-26622.pdf, Dell, Inc., (Nov. 2013).

Scarfone, Karen et al., "Guide to Intrusion Detection and Prevention Systems (IDPS)", http://csrc.nist.gov/publications/nistpubs/800-94/SP800-94, National Institute of Standards and Technology, Special Publication 800-94, (Feb. 2007).

Dezert, Jean et al., "On The Validity of Dempster-Shafer Theory", Fusion 2012—15th International Conference on Information Fusion, Singapour, Singapore, (Jul. 2012).

Kevin Roundy, et al; Systems and Methods for Using Event-Correlation Graphs to Detect Attacks on Computing Systems; U.S. Appl. No. 14/041,762, filed Sep. 30, 2013.

Ilya Sokolov, et al; Systems and Methods for Notifying Contacts About the Status of Persons Impacted by Significant Unforseen Events; U.S. Appl. No. 14/525,244, filed Oct. 28, 2014.

"Google now", http://www.google.com/landing/now/#whatisit, as accessed Aug. 28, 2014, (Jun. 28, 2012).

"Bing Maps", http://www.bing.com/maps/, as accessed Aug. 28, 2014, (Jun. 11, 2009).

"Google Now", https://plus.google.com/+google/posts/WhNRboMLynU, as accessed Aug. 18, 2015, (Mar. 29, 2014).

Keith Newstadt, et al; Systems and Methods for Validating Login Attempts Based on User Location; U.S. Appl. No. 14/197,687, filed Mar. 5, 2014.

Keith Newstadt; Systems and Methods for Validating Login Attempts Based on User Location; U.S. Appl. No. 14/735,195, filed Jun. 10, 2015.

Michael Shavell, et al; Systems and Methods for Storing Information About Transmission Control Protocol Connections; U.S. Appl. No. 14/314,263, filed Jun. 25, 2014.

Haas, Juergen; SYN flood; http://linux.about.com/cs/linux101/g/synflood.htm, as accessed Jul. 10, 2014; About.com.

Shane Pereira; Systems and Methods for Thwarting Illegitimate Initialization Attempts; U.S. Appl. No. 14/485,287, filed Sep. 12, 2014.

Hobgood, et al., Advanced Automatic Crash Notifications and, Urgency Factors: Can We Standardize?, APCO 2011, PowerPoint Slides, Jul. 22, 2012.

Asi, et al., Black Box System Design, Dec. 14, 2010.

Ignacio Bermudez Corrales, et al; Systems and Methods for Identifying Compromised Devices Within Industrial Control Systems; U.S. Appl. No. 14/952,344, filed Nov. 25, 2015.

Bolzoni; Poseidon: a 2-tier Anomaly-based Intrusion Detection System; http://doc.utwente.nl/54544/1/00000150.pdf, as accessed Sep. 29, 2015; International Workshop on Information Assurance, IEEE, London.

Caselli; Sequence-aware Intrusion Detection in Industrial Control Systems; CPSS'15, Proceedings of the 1st ACM Workshop on Cyber-Physical System Security, 2015.

(56) References Cited

OTHER PUBLICATIONS

Cisco Anomaly Guard Module; http://www.cisco.com/c/en/us/products/collateral/interfaces-modules/catalyst-6500-7600-router-anomaly-guard-module/product_data_sheet0900aecd80220a7c.html, as accessed Sep. 29, 2015; Document ID1457308823644728.
Distributed control system; https://en.wikipedia.org/wiki/Distributed_control_system, as accessed Sep. 29, 2015; Wikipedia.
Garitano; A Review of SCADA Anomaly Detection Systems; Advances in Intelligent and Soft Computing, 2016.
Ginter; Experience with Network Anomaly Detection on Industrial Networks; Industrial Control Systems Joint Working Group (ICSJWG), 2010.
Hadziosmanovi; N-Gram against the Machine: On the Feasibility of the N-Gram Network Analysis for Binary Protocols; Research in Attacks, Intrusions, and Defenses. 2012.
KISS; Data Clustering-based Anomaly Detection in Industrial Control Systems; Intelligent Computer Communication and Processing, IEEE. 2014.
Mahoney; Phad: Packet Header Anomaly Detection for Identifying Hostile Network Traffic; https://cs.fit.edu/~mmahoney/paper3.pdf, as accessed Sep. 29, 2015.
Mantere; Network Traffic Features for Anomaly Detection in Specific Industrial Control System Network; Future Internet 2013, vol. 5 (6), MDPI.
Perdisci; McPad : A Multiple Classifier System for Accurate Payload-based Anomaly Detection; https://pralab.diee.unica.it/sites/default/files/Perdisci_COMNET2009.pdf, as accessed Sep. 29, 2015; Computer Networks, vol. 53, Issue 6.
Snort (software); https://en.wikipedia.org/wiki/Snort_(software), as accessed Sep. 29, 2015; Wikipedia.
The Bro Network Security Monitor; https://www.bro.org/, as accessed Sep. 29, 2015.
Wang; Anagram: A Content Anomaly Detector Resistant to Mimicry Attack; https://mice.cs.columbia.edu/getTechreport.php?techreportID=403&format=pdf&, as accessed Sep. 29, 2015; Recent Advances in Intrusion Detection.
Walter Bogorad; Systems and Methods for Detecting Anomalies That Are Potentially Indicative of Malicious Attacks; U.S. Appl. No. 15/059,326, filed Mar. 3, 2016.
Aggarwal; Outlier Analysis; http://www.springer.com/us/book/9781461463955, as accessed Feb. 1, 2016, (2013).
Dunning; Practical Machine Learning: A New Look At Anomaly Detection; https://www.mapr.com/practical-machine-learning-new-look-anomaly-detection, as accessed Feb. 1, 2016, (Jul. 21, 2014).
KIND; Histogram-based traffic anomaly detection; http://ieeexplore.ieee.org/document/5374831, as accessed Feb. 1, 2016; IEEE Transactions on Network and Service Management, vol. 6, Issue 2, (Jun. 2009).
Wang; Network anomaly detection: A survey and comparative analysis of stochastic and deterministic methods; http://ieeexplore.ieee.org/document/6759879/?arnumber=6759879, as accessed Feb. 1, 2016; 2013 IEEE 52nd Annual Conference on Decision and Control (CDC), (Dec. 10-13, 2013).
Yolacan; Learning From Sequential Data for Anomaly Detection; https://repository.library.northeastern.edu/downloads/neu:349795, as accessed Feb. 1, 2016; Dissertation, (Oct. 2014).
Michael Sylvester Pukish, et al; Systems and Methods for Detecting Obscure Cyclic Application-Layer Message Sequences in Transport-Layer Message Sequences; U.S. Appl. No. 15/271,494, filed Sep. 21, 2016.
K. Nyalkalkar et al., "A comparative study of two network-based anomaly detection methods," in 2011 Proceedings IEEE INFOCOM, 2011.
S. Sinha et al., "WIND: Workload-Aware INtrusion Detection," in Recent Advances in Intrusion Detection, D. Zamboni and C. Kruegel, Eds. Springer Berlin Heidelberg, 2006.
L. Huang et al., "In-network PCA and anomaly detection," in In NIPS, 2006.
N. Goldenberg et al., "Accurate modeling of Modbus/TCP for intrusion detection in SCADA systems," Int. J. Crit. Infrastruct. Prot., vol. 6, No. 2, Jun. 2013.
M.-K. Yoon et al., "Communication Pattern Monitoring: Improving the Utility of Anomaly Detection for Industrial Control Systems," in Internet Society, San Diego, CA, USA, 2014.
N. Borisov et al., "Generic Application-Level Protocol Analyzer and its Language," Microsoft Research, MSR-TR-2005-133, Feb. 2005.
"Transmission Control Protocol", http://en.wikipedia.org/wiki/Transmission_Control_Protocol, as accessed Jul. 10, 2014, Wikipedia, (Dec. 18, 2003).
A. Greenberg, "Hackers Remotely Kill a Jeep on the Highway—With Me in It," WIRED, Jul. 21, 2015. [Online]. Available: http://www.wired.com/2015/07/hackers-remotely-kill-jeep-highway/. [Accessed: Mar. 30, 2016].
Extending schedulability analysis of Controller Area Network (CAN) for mixed (periodic/sporadic) messages (http://ieeexplore.ieee.org/document/6059010/); Sep. 5, 2011.
A structured approach to anomaly detection for in-vehicle networks (http://ieeexplore.ieee.org/stamp/stamp.jsp?arnumber=5604050); Aug. 23, 2010.
Intrusion Detection Systems (IDS) Part 2—Classification; methods; techniques (http://www.windowsecurity.com/articles-tutorials/intrusion_delection/IDS-Part2-Classification-methods-techniques.html); Jun. 15, 2014.
Steven Noel et al.; Correlating Intrusion Events and Building Attack Scenarios Through Attack Graph Distances; 20th Annual Computer Security Applications Conference; ACSAC '04; Tucson, AZ, USA; Dec. 6-10, 2004.

\* cited by examiner

| | | | Messages | |
| | | | 502 | |

| Time | Content | Temp Mask | Do-mask Mask | Do-not-mask Mask |
|---|---|---|---|---|
| - | - | - | 11 11 11 | 00 00 00 |
| 100 | 0a ff 13 | - | 11 11 11 | 00 00 00 |
| 200 | 0b ff 13 | 01 00 00 | 10 11 11 | 00 00 00 |
| ... | | | | |
| 1000 | 0c ff 13 | 01 00 00 | 10 11 11 | 00 00 00 |
| 1050 | 0d ff 15 | 01 00 01 | 10 11 11 | 00 00 01 |
| 1100 | 0e ff 15 | 01 00 00 | 10 11 11 | 00 00 01 |
| ... | | | | |

*FIG. 5*

SYSTEMS AND METHODS FOR IDENTIFYING SUSPICIOUS CONTROLLER AREA NETWORK MESSAGES

BACKGROUND

Many threats exist that target computing devices, and just as many defensive measures exist against these threats. Viruses are combatted by anti-virus applications, malware by anti-malware applications, network intrusions by firewalls, and so on. However, the majority of these defensive systems are designed for attacks against powerful computing devices such as laptops, desktops, and servers. Comparatively little has been done to secure systems with fewer computing resources, such as those that control vital functions in motor vehicles.

Previously, computing systems in automobiles were relatively simple and not connected to any outside network, making such systems fairly secure against attack. However, current trends in automobile design incorporate an increasing number of complicated features into vehicles' computing systems, increasing the surface area for attack. Worse, many automobiles now feature computing systems with Internet connectivity, vastly increasing the likelihood of attack from malicious individuals and applications. Because the computing systems and networks used for vehicles are so different from those used for personal computers, many traditional security technologies cannot be easily adapted to protect automobiles. One area that is especially lacking is the ability to identify potentially malicious messages sent via the controller area networks that are often used by motor vehicles. The instant disclosure, therefore, identifies and addresses a need for systems and methods for identifying suspicious controller area network messages.

SUMMARY

As will be described in greater detail below, the instant disclosure describes various systems and methods for identifying suspicious controller area network messages.

In one example, a computer-implemented method for identifying suspicious controller area network (CAN) messages may include (i) monitoring, for a predetermined period of time, messages sent by an electronic control unit that include a CAN identifier (ID) for at least one CAN device, (ii) observing, in the messages, a set of corresponding patterns that includes a first pair of corresponding patterns that includes a first content pattern in the messages that corresponds to a first timing pattern of the messages and an additional pair of corresponding patterns that is different from the first pair of corresponding patterns and that includes an additional content pattern in the messages that corresponds to an additional timing pattern of the messages, (iii) detecting a message that includes the CAN identifier, where a content pattern of the message and a timing pattern of the message do not match any pair of corresponding patterns in the set of corresponding patterns, and (iv) determining that the message is suspicious based at least in part on the content pattern of the message and the timing pattern of the message not matching any pair of corresponding patterns in the set of corresponding patterns.

In some examples, the computer-implemented method may further include performing a security action in response to determining that the message is suspicious. In some embodiments, performing the security action may include blocking the message.

In one embodiment, the first pair of corresponding patterns may include a pair of corresponding patterns that occur in messages sent at regular intervals and the additional pair of corresponding patterns may include a pair of corresponding patterns that occur in messages sent outside of the regular intervals. Additionally or alternatively, the first pair of corresponding patterns may include a pair of corresponding patterns that occur in messages sent during an active state of the CAN device and the additional pair of corresponding patterns may include a pair of corresponding patterns that occur in messages sent during an inactive state of the CAN device.

In some examples, detecting the message that includes the CAN identifier, where the content pattern of the message and the timing pattern of the message do not match any pair of corresponding patterns in the set of corresponding patterns, may include creating a set of rules by creating, for each pair of corresponding patterns in the set of corresponding patterns, a rule that identifies messages that include the pair of corresponding patterns and detecting that the message does not adhere to any rule within the set of rules. In one embodiment, the CAN device may monitor at least one sensor of a motor vehicle.

In one embodiment, each message within the messages may include a series of bits. In some embodiments, observing, in the messages, the set of corresponding patterns may include creating a mask that masks out bits in the series of bits. In these embodiments, detecting the message with the content pattern and the timing pattern that do not match any pair of corresponding patterns in the set of corresponding patterns may include monitoring, for each message, only bits in the series of bits that are not the bits masked out by the mask.

In one embodiment, a system for implementing the above-described method may include (i) a monitoring module, stored in memory, that monitors, for a predetermined period of time, messages sent by an electronic control unit that include a CAN identifier for at least one CAN device, (ii) an observation module, stored in memory, that observes, in the messages, a set of corresponding patterns that includes a first pair of corresponding patterns that includes a first content pattern in the messages that corresponds to a first timing pattern of the messages and an additional pair of corresponding patterns that is different from the first pair of corresponding patterns and that includes an additional content pattern in the messages that corresponds to an additional timing pattern of the messages, (iii) a detection module, stored in memory, that detects a message that includes the CAN identifier, where a content pattern of the message and a timing pattern of the message do not match any pair of corresponding patterns in the set of corresponding patterns, (iv) a determination module, stored in memory, that determines that the message is suspicious based at least in part on the content pattern of the message and the timing pattern of the message not matching any pair of corresponding patterns in the set of corresponding patterns, and (v) at least one physical processor configured to execute the monitoring module, the observation module, the detection module, and the determination module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) monitor, for a predetermined period of time, messages sent by an electronic control unit that include a CAN identifier for at least one CAN device, (ii) observe, in the messages, a set of corresponding patterns that includes a first pair of corresponding patterns that includes a first content pattern in the messages that corresponds to a first timing pattern of the messages an additional pair of corresponding patterns that is different from the first pair of corresponding patterns and that includes an additional content pattern in the messages that corresponds to an additional timing pattern of the messages, (iii) detect a message that includes the CAN identifier, where a content pattern of the message and a timing pattern of the message do not match any pair of corresponding patterns in the set of corresponding patterns, and (iv) determine that the message is suspicious based at least in part on the content pattern of the message and the timing pattern of the message not matching any pair of corresponding patterns in the set of corresponding patterns.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

FIG. 5 is a block diagram of additional example messages.

Figure 1:
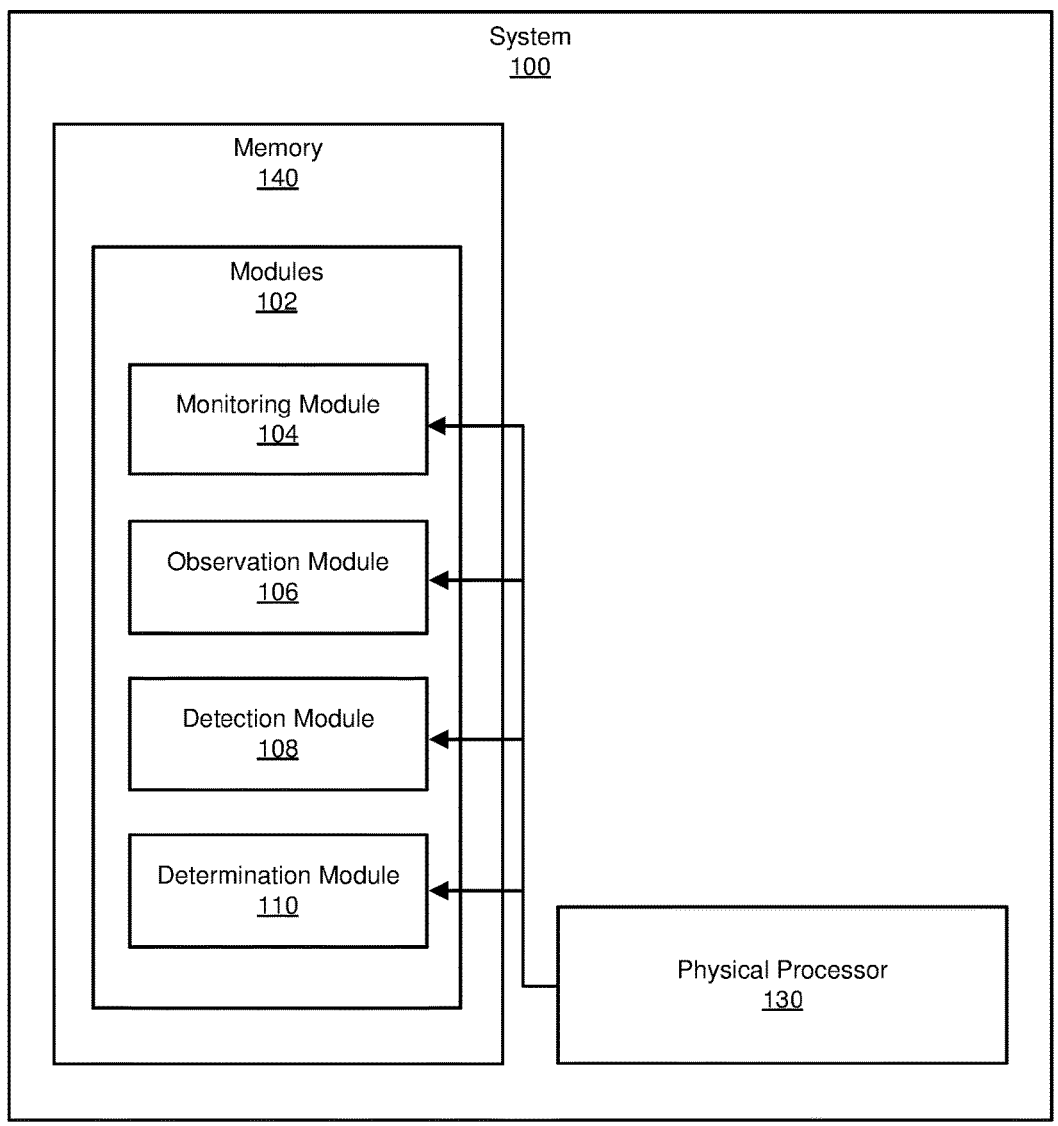
FIG. 1 is a block diagram of an example system for identifying suspicious controller area network messages.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for identifying suspicious controller area network messages. As will be explained in greater detail below, by observing legitimate messages sent during multiple states and/or cycle types, the systems and methods described herein may be able to accurately identify anomalous messages while avoiding false positives being caused by legitimate messages that occur during less common states and/or events. By performing a thorough observation of legitimate messages and crafting rules accordingly, the systems and methods described herein may improve the security of a computing system that uses a CAN by more accurately detecting suspicious messages. These systems and methods may also improve the field of vehicular computer security and/or embedded security by improving the accuracy of systems for detecting potentially malicious messages sent via a CAN.

Figure 2:
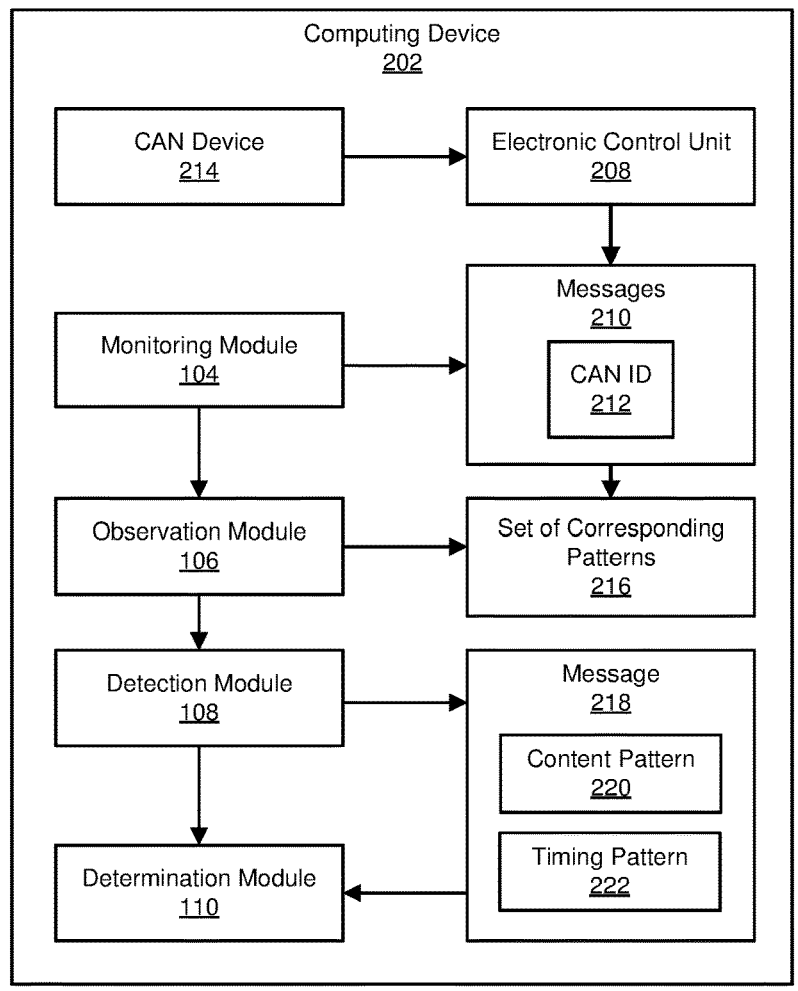
FIG. 2 is a block diagram of an additional example system for identifying suspicious controller area network messages.

The following will provide, with reference to FIGS. 1-2, detailed descriptions of example systems for identifying suspicious controller area network messages. Detailed descriptions of corresponding computer-implemented methods will also be provided in connection with FIG. 3. Detailed descriptions of example messages will be provided in connection with FIGS. 4-5. In addition, detailed descriptions of an example computing system and network architecture capable of implementing one or more of the embodiments described herein will be provided in connection with FIGS. 6 and 7, respectively.

FIG. 1 is a block diagram of example system 100 for identifying suspicious CAN messages. As illustrated in this figure, example system 100 may include one or more modules 102 for performing one or more tasks. For example, and as will be explained in greater detail below, example system 100 may include a monitoring module 104 that monitors, for a predetermined period of time, messages sent by an electronic control unit that include a CAN identifier for at least one CAN device. Example system 100 may additionally include an observation module 106 that observes, in the messages, a set of corresponding patterns that includes a first content pattern in the messages that corresponds to a first timing pattern of the messages and an additional pair of corresponding patterns that is different from the first pair of corresponding patterns and that includes an additional content pattern in the messages that corresponds to an additional timing pattern of the messages. Example system 100 may also include a detection module 108 that detects a message that includes the CAN identifier, where a content pattern of the message and a timing pattern of the message do not match any pair of corresponding patterns in the set of corresponding patterns. Example system 100 may additionally include a determination module 110 that determines that the message is suspicious based at least in part on the content pattern of the message and the timing pattern of the message not matching any pair of corresponding patterns in the set of corresponding patterns. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as computing device 202 in FIG. 2. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate identifying suspicious controller area network messages. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 identify suspicious CAN messages. For example, and as will be described in greater detail below, monitoring module 104 may monitor, for a predetermined period of time, messages 210 sent by an electronic control unit 208 that include a CAN ID 212 for at least one CAN device 214. During some portion of the time monitoring module 104 is monitoring messages 210, observation module 106 may observe, in messages 210, a set of corresponding patterns 216. At some point in time, detection module 108 may detect a message 218 that include CAN ID 212, where a content pattern 220 of message 218 and a timing pattern 222 of message 218 do not match any pair of corresponding patterns in set of corresponding patterns 216. After message 218 has been detected, determination module 110 may determine that message 218 is suspicious based at least in part on the content pattern 220 of message 218 and the timing pattern 222 of message 218 not matching any pair of corresponding patterns in set of corresponding patterns 216.

Computing device 202 generally represents any type or form of computing device capable of reading computer-executable instructions. In some embodiments, computing device 202 may be an embedded system in a motor vehicle and/or may operate as part of and/or monitor a CAN in a motor vehicle. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Electronic control unit 208 generally represents any type or form of embedded system in an automotive vehicle that controls and/or interacts with one or more subsystems and/or devices. CAN device 214 generally represents any type or form of device and/or microcontroller that communicates via a CAN. CAN ID 212 generally represents any type of identifier of a CAN device. Messages 210 generally represent any type or form of messages sent via a CAN. Set of corresponding patterns 216 generally represents any set container two or more pairs of corresponding patterns of any type. Message 218 generally represents any message sent via a CAN that includes a CAN ID. Content pattern 220 generally represents any pattern in the content of a message sent via a CAN. Timing pattern 222 generally represents any pattern in the timing of a message sent via a CAN.

Figure 3:
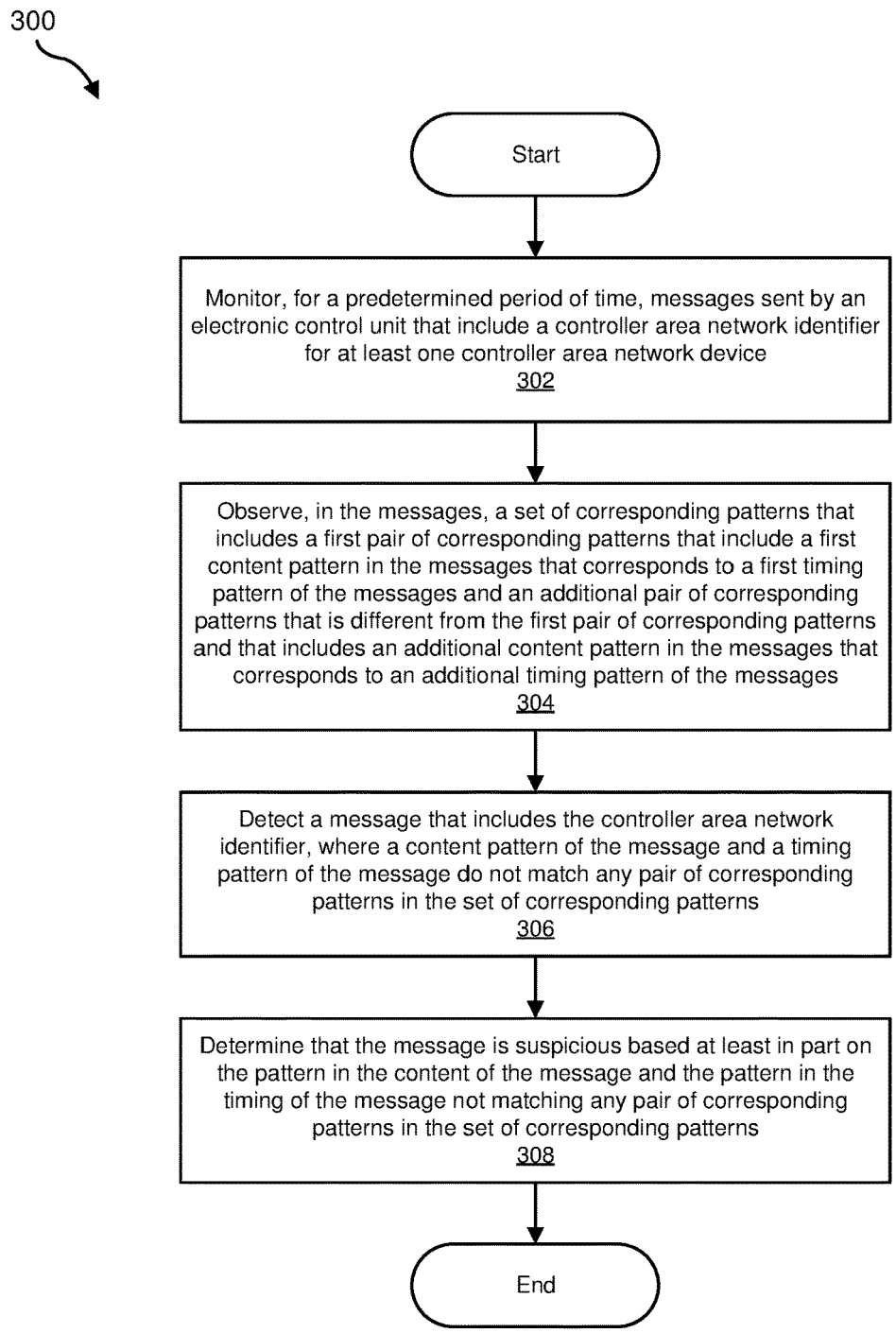
FIG. 3 is a flow diagram of an example method for identifying suspicious controller area network messages.

FIG. 3 is a flow diagram of an example computer-implemented method 300 for identifying suspicious controller area network messages. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may monitor, for a predetermined period of time, messages sent by an electronic control unit that include a CAN identifier for at least one CAN device. For example, monitoring module 104 may, as part of computing device 202 in FIG. 2, monitor, for a predetermined period of time, messages 210 sent by electronic control unit 208 that include a CAN ID 212 for a CAN device 214.

The term "electronic control unit," as used herein, generally refers to any embedded system that controls one or more devices, subsystems, and/or microcontrollers. In some embodiments, an electronic control unit may control one or more devices in a motor vehicle. Examples of an electronic control unit may include, without limitation, an engine control module, a transmission control module, a brake control module, a door control unit, a speed control unit, and/or a battery management system. In some embodiments, one electronic control unit may control multiple related subsystems, such as the engine and the transmission. In other embodiments, one electronic control unit may control multiple unrelated subsystems, such as the air conditioning, brakes, and sound system. In some embodiments, an electronic control unit may send and/or receive multiple types of messages associated with multiple CAN IDs.

The term "controller area network" or "CAN," as used herein, generally refers to any connection between computing systems and/or set of connected computing systems using a message-based protocol via multiplex electrical wiring. In some embodiments, a CAN may include a system of computing devices connected via CAN buses operating within a motor vehicle. In some embodiments, a CAN may carry messages to and/or from electronic control units containing the statuses of and/or instructions for devices controlled by the electronic control units.

The term "controller area network device" or "CAN device," as used herein, generally refers to any device and/or microcontroller that communicates via a CAN and/or is controlled by an electronic control unit. In one embodiment, a CAN device may monitor at least one sensor of a motor vehicle. In some embodiments, a CAN device may be a subsystem of a larger system. For example, a CAN device that is controlled by a door control unit may monitor and/or control the window, lock, child lock, and/or closed/open state of a door.

The term "controller area network identifier" or "CAN ID," as used herein, generally refers to any identifier of a CAN device and/or a combination of CAN devices that are controlled by an electronic control unit. In some examples, a CAN ID may identify messages sent from and/or to a predetermined set of CAN devices. For example, a single CAN ID may identify messages that contain information about a door lock, media system, speedometer, and temperature gauge. In some embodiments, a CAN ID may include an alphanumeric string. In one embodiment, a CAN ID may be represented as a hexadecimal string.

The term "message," as used herein, generally refers to any electronic communication. In some embodiments, a message may be a communication sent over a CAN. In some examples, a message may be composed of a series of bits. In one embodiment, a message may be sent by and/or to an electronic control unit. In some embodiments, a message may include a CAN ID for multiple CAN devices and information about and/or instructions to those CAN devices. In some embodiments, an electronic control unit may send messages to and/or receive messages from a predetermined set of CAN devices and each message sent by and/or to the electronic control unit may include information pertaining to and/or instructions for each CAN device. For example, a door control until may send and/or receive messages that include information on the status of the front passenger door window, information on the status of the lock on the front passenger door, information on the status of the side mirror attached to the front passenger door, and/or a CAN ID that identifies messages involving that specific set of devices. In another embodiment, an electronic control unit may control multiple unrelated devices. For example, an electronic control unit and send and/or receive messages that include information about a device that controls air conditioning, information about a device that controls front brakes, information about a device that controls turn signals, information about a device that controls a horn, and/or a CAN ID that identifies messages involving the aforementioned set of devices. In some embodiments, information from each CAN device may be assigned to a specific bit range within a message. For example, a message may include a CAN ID in the first eight bits, a payload length in the next four bits, a status for a turn signal in the next two bits, a status for tire pressure in the left rear tire in the next two bits, a status for tire pressure in the right rear tire in the next two bits, and/or a status for the sound system in the next four bits.

Monitoring module 104 may monitor the messages sent by the electronic control unit in a variety of ways. For example, monitoring module 104 may monitor the messages for a fixed period of time, such as a day, a week, or a month. In other embodiments, monitoring module 104 may monitor the messages for an indefinite period of time. In some embodiments, monitoring module 104 may intercept messages in order to examine the contents and/or timing of the messages.

At step 304, one or more of the systems described herein may observe, in the messages, a set of corresponding patterns that includes a first pair of corresponding patterns that includes a first content pattern in the messages that corresponds to a first timing pattern of the messages and an additional pair of corresponding patterns that is different from the first pair of corresponding patterns and that includes an additional content pattern in the messages that corresponds to an additional timing pattern of the messages. For example, observation module 106 may, as part of computing device 202 in FIG. 2, observe, in messages 210, set of corresponding patterns 216.

The term "content pattern," as used herein, generally refers to any pattern in the repetition or non-repetition of content between a message and the surrounding messages. For example, if each message is composed of two portions, the first of which changes in every message and the second of which is the same value in every message, the content pattern of those messages is a dynamic portion followed by a static portion. Other examples of content patterns may include content that predictably toggles between two values, content that predictably cycles between three or more values in order, content that increments and/or decrements at a predictable rate, content that alternates between multiple known values, content that varies in value within known parameters, and/or combinations of the above. For example, a counter that increases by one every message may present a pattern of incrementing at a predictable rate. In another example, a sensor that sends data about the angle of a car's steering wheel may increment and/or decrement at a predictable rate. In another example, a sensor that sends data about a device that may have several states, such as a sound system that may relay audio from a radio, a compact disc player, or an external device, may present a content pattern that alternates between multiple known values representing the several states.

The term "timing pattern," as used herein, generally refers to any pattern in the timing at which messages are sent in relation to other messages. In some embodiments, a timing pattern may describe messages being sent at regular intervals. For example, a timing pattern may describe messages being sent every 100 milliseconds, every 10 milliseconds, or every 20 milliseconds. In some embodiments, a timing pattern may describe messages being sent outside regular intervals. For example, a timing pattern may describe a message not being sent at a 100 millisecond interval of the surrounding messages, which are sent at 100 millisecond intervals. In some embodiments, the aforementioned pair of timing patterns may be typical of CAN devices that send messages at regular intervals and also send messages whenever the CAN device experiences an event such as a state change that occurs between the regular intervals.

The term "pair of corresponding patterns," as used herein, generally refers to any specific content pattern that occurs in conjunction with a specific timing pattern. For example, a portion of a message may have a value of "00" in messages sent at 10 millisecond intervals and a value of "11" in messages sent with the same CAN ID at 100 millisecond intervals. In this example, the first pair of corresponding patterns may include the content pattern "00" and the timing pattern of 10 millisecond intervals, while the second pair of corresponding patterns may include the content pattern "11" and the timing pattern of 100 millisecond intervals.

Observation module 106 may observe a variety of different sets of corresponding patterns. For example, the first pair of corresponding patterns may include a pair of corresponding patterns that occur in messages sent during an active state of the CAN device and the additional pair of corresponding patterns may include a pair of corresponding patterns that occur in messages sent during an inactive state of the CAN device. In some examples, a CAN device may exhibit an active state when the CAN device is currently in operation and an inactive state when the CAN device is not currently in operation. In one example, a CAN device that controls and/or monitors cruise control may be in an active state when the cruises control is on and an inactive state when the cruise control is off. In another example, a CAN device that monitors a car's steering may be in an active state when the car is turning and an inactive state when the car is not turning. In some embodiments, a message that includes information about multiple CAN devices may be regarded as a part of a message pattern (e.g., relating to timing and/or content) corresponding to an active state if at least one of the CAN devices is currently active, even if the other devices are not active. For example, if an electronic control unit sends and/or receives messages with one CAN ID containing information about cruise control, headlights, and a door lock, the messages may exhibit the pair of corresponding patterns for the active state when the cruise control is on even if the headlights are not on and the door lock is not engaged.

Figure 4:
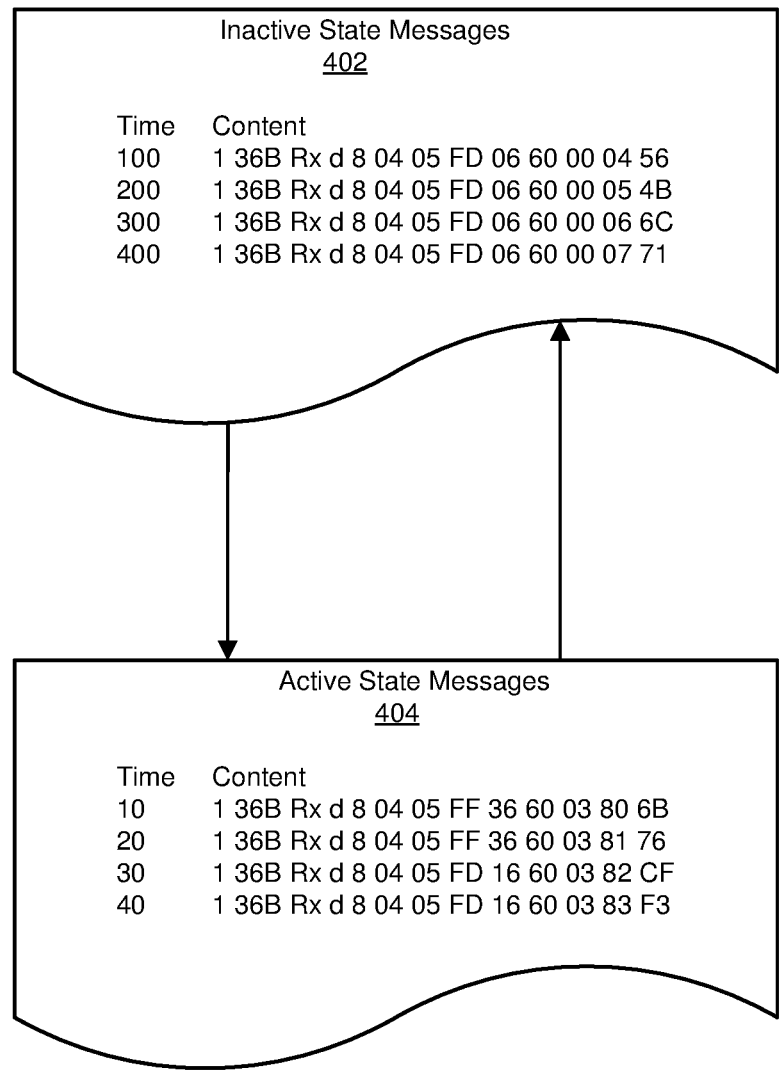
FIG. 4 is a block diagram of example messages.

In some examples, a timing and/or content pattern that occurs during an active state may be different than a timing and/or content pattern that occurs during an inactive state. For example, as illustrated in FIG. 4, inactive state messages 402 may exhibit different timing and content than active state messages 404. In some examples, inactive state messages 402 may exhibit a timing pattern of being sent at an interval of 100 milliseconds while active state messages 404 may exhibit a timing pattern of being sent at an interval of 10 milliseconds. In one example, inactive state messages 402 may exhibit a content pattern that includes fixed values of "1 36B Rx d 8 04 05 FD 06 60 00" for the first eleven portions of the message, a value that increments by one each message for the twelfth portion of the message, and an unpredictably changing value for the thirteenth portion of the message. In this example, active state messages 404 may exhibit a content pattern that includes the same fixed values as inactive state messages 402 for the first seven portions of the message, two portions of the message that change between at least two different values, a ten portion of the message that is the same as in the inactive state, an eleventh portion that is a fixed value, "03," that differs from the inactive state fixed value of "00," a twelfth portion that increments by one each message as in the inactive state, and a thirteen portion of the message that has an unpredictable value.

In this example, if the systems described herein observed messages only during the inactive state, the systems described herein may later flag messages with an interval time of 10 milliseconds and/or an eleventh portion value of "03" as anomalous, when in fact those characteristics are perfectly normal for a legitimate message during the active state. By observing messages and determining patterns for legitimate messages in both states, the systems described herein may eliminate false positives that would otherwise be caused by messages sent during a state that was not observed during the observation period.

In one example, the first pair of corresponding patterns may include a pair of corresponding patterns that occur in messages sent at regular intervals and the additional pair of corresponding patterns may include a pair of corresponding patterns that occur in messages sent outside of the regular intervals. In some examples, messages sent by electronic control units may follow an event-periodic cycle. In event-periodic cycle, the electronic control unit sends and/or receives messages at regular intervals regardless of whether or not the CAN devices being controlled by the electronic control unit trigger events and also sends and/or receives messages when any of the CAN devices triggers an event. For example, an electronic control unit that controls a car's brakes may send and/or receive scheduled messages every 100 milliseconds but may also send and/or receive a message whenever the brakes are activated, even if the last scheduled message was sent less than 100 milliseconds ago. In this example, the messages sent at the 100 millisecond intervals may exhibit a different content pattern than the event-triggered messages sent between intervals.

In some embodiments, messages may follow an event-periodic rule for content, where the next scheduled message after an event-triggered message repeats a predetermined portion of the content of the event-triggered message. In some embodiments, scheduled messages that follow the event-periodic rule may repeat any values that were changed by the event that triggered the event-triggered message. For example, a value at a certain location in the content of a message may be "0" if the car's brakes are not being applied and "1" if the car's brakes are being applied. In this example, if the brakes are applied partway through a scheduled interval, a scheduled message prior to the brakes being applied may have a value of "0," followed by an event-triggered message with a value of "1," followed by a scheduled message with a value of "1."

In some embodiments, the systems described herein may monitor messages in order to observe patterns during an initial observation phase and may then move into a detection phase during which these systems may compare messages with the observed patterns to detect potentially malicious messages. In some examples, the systems described herein may only observe patterns during the initial observation phase and not update observed patterns thereafter (e.g., during the detection phase). In other embodiments, the systems described herein may continue monitoring messages in order to observe and/or update patterns during the detection phase.

Returning to FIG. 3, at step 306, one or more of the systems described herein may detect a message that may include the CAN identifier, where a content pattern of the message and a timing pattern of the message do not match any pair of corresponding patterns in the set of corresponding patterns. For example, detection module 108 may, as part of computing device 202 in FIG. 2, detect message 218 that may include the CAN ID 212, where content pattern 220 of message 218 and timing pattern 222 of message 218 do not match any pair of corresponding patterns in set of corresponding patterns 216.

Detection module 108 may detect the message in a variety of ways. For example, detection module 108 may monitor all messages sent and/or received by electronic control units in order to detect potentially malicious messages. In some embodiments, detection module 108 may detect the message by examining the message in a series of stages. For example, detection module 108 may first check to determine whether the content of the message follows any known content pattern. If the content of the message does not follow any known content pattern, detection module 108 may determine that the message does not match any pair of corresponding patterns. If the content of the message does follow a known content pattern, detection module 108 may check whether the timing pattern of the message matches the correct corresponding timing pattern for the known content pattern. If the timing pattern of the message does not match the correct corresponding content pattern, detection module 108 may determine that the message does not match any pair of corresponding patterns. In other embodiments, detection module 108 may first check the timing pattern of the message and may then check the content pattern of the message.

In some examples, detection module 108 may examine messages with the same CAN ID sent after the message was sent in order to determine whether the message matches any pair of corresponding patterns. For example, if the messages follow the event-periodic rule (described above in connection with step 304), a message may be sent at a different timing than the usual interval with a changed value in the content from the content of the previous message. If the next message sent at the usual interval has the same changed value as the message, detection module 108 may determine that the message matches the pair of corresponding patterns that describe event-triggered messages. However, if the next message sent at the usual interval does not have the same changed value as the message, detection module 108 may determine that the message is not following the event-periodic rule and thus does not match any pair of corresponding patterns.

In some examples, detection module 108 may detect the message by creating, for each pair of corresponding patterns in the set of corresponding patterns, a rule that identifies messages that include the pair of corresponding patterns and detecting that the message does not adhere to any rule within the set of rules. For example, returning to FIG. 4, after observing inactive state messages 402 and active state messages 404, the systems described herein may create a rule for each state. The active state rule may state that legitimate messages have a timing pattern of 10 millisecond intervals and a content pattern of "1 36B Rx d 8 04 05 [FF or FD] [36 or 16] 60 03 [counter] [any]." The inactive state rule may state that legitimate messages have a timing pattern of 100 millisecond intervals and a content pattern of "1 36B Rx d 8 04 05 FD 06 60 00 [counter] [any]." In this example, if detection module 108 detects a message that does not follow either of these rules, detection module 108 may determine that the content pattern and timing pattern of the message do not match any pair of corresponding patterns in the set of corresponding patterns. In some embodiments, the systems described herein may use simpler rules that only account for changes in a portion of the content, not the possible values of the content. For example, the systems described herein may describe the content pattern of the active state as "1 36B Rx d 8 04 05 * * 60 03 * *," where a "*" represents a portion of the message that may have any value.

In one embodiment, each message within the messages may include a series of bits and observing, in the messages, the set of corresponding patterns may include creating a mask that masks out bits in the series of bits. In this embodiment, detection module 108 may detect the message with the content pattern and the timing pattern that do not match any pair of corresponding patterns in the set of corresponding patterns by monitoring, for each message, only bits in the series of bits that are not the bits masked out by the mask. In some embodiments, the systems described herein may mask out some bits in order to save computing resources by examining only portions of the messages rather than the full content of the messages. In some examples, the systems described herein may determine, during the observation phase, which bits follow predictable patterns in legitimate messages and thus indicate the presence of an illegitimate message when the pattern is broken and which bits are not predictable in legitimate messages and thus do not give any indication as to whether a message is illegitimate. In these examples, the systems described herein may only examine the bits that follow predictable patterns in order to avoid using resources to examine the bits that do not give any indication of whether a message is legitimate. In some embodiments, the systems described herein may mask out portions of messages at the level of nibbles (i.e., sets of four binary digits), bytes, and/or other units of size rather than bits in order to further conserve computing resources.

In one example, the systems described herein may monitor messages that follow the event-periodic rule (described above in connection with step 304) and may create a mask that masks out irrelevant, unpredictable bits but does not mask out bits subject to the event-periodic rule. In one embodiment, the systems described herein may create this mask by combining two temporary masks, a do-mask mask that records bits that change value and therefore should be masked in the final mask and a do-not-mask (DNM) mask that records bits that follow the event-periodic rule and therefore should not be masked in the final mask. For example, as illustrated in FIG. 5, messages 502 may include a number of messages sent at different times with various content and corresponding states of masks. In some embodiments, the do-mask mask may initialize to "11 11 11," indicating that every bit should be examined, and the DNM mask may initialize to "00 00 00," indicating that no bit has yet been discovered that follows the event-periodic rule. At 100 milliseconds, the systems described herein may intercept a message that includes the content "0a ff 13." Because there is no previous message to compare the first message to, the systems described herein may not update either mask.

At 200 milliseconds, the systems described herein may intercept a message that includes the content "0b ff 13." The systems described herein may store the change between the new message and the previous message in a temporary mask as "01 00 00," reflecting that the second bit has changed and the other bits have not. In some embodiments, the systems described herein may then update the do-mask mask using the bitwise equation "do-mask mask=do-mask mask AND [NOT(temp mask AND NOT(DNM mask))]." That is, the new value of the do-mask mask may set to "1" any value that is set to "1" in both the current value of the do-mask mask and the inverse of any value that is set to "1" in both the inverse of the temporary mask and the inverse of the current value of the DNM mask, and may set all other values to "0." In this example, the inverse of the current state of the DNM mask is "11 11 11." The bitwise AND of this inverse and the temp mask is "01 00 00," because only the second bit is a "1" in both masks. The inverse of the resulting value is "10 11 11." The bitwise and of this value and the current value of the do-mask mask is "10 11 11," which is now the new value of the do-mask mask. In practical terms, this means that the current state of the do-mask mask indicates that the second bit is to be ignored in the final mask because the second bit has been observed to change, but all other bits are to be examined. In some embodiments, the systems described herein may only update the DNM mask when a message is received outside of the usual interval and may not update the DNM mask when a message is received at the usual interval.

In some examples, the systems described herein may continue to receive messages at 100 millisecond intervals (and update the do-mask mask accordingly) and may eventually receive a message at 1000 milliseconds with the content "0c ff 13." The systems described herein may then receive an event-triggered message at 1050 milliseconds with the content "0d ff 15." In some embodiments, the systems described herein may update the DNM mask using the equation "DNM mask=DNM mask OR [temp mask AND (do-mask mask)]." That is, the new value of the DNM mask may be set to "1" for any position that is set to "1" in either the current value of the DNM mask or both the temp mask and the do-mask mask, and all other values may be set to "0." In this example, the bitwise AND of the current state of the temp mask and the current state of the do-mask mask may be "00 00 01." The bitwise OR of the resulting value and the current state of the DNM mask may be "00 00 01." In practical terms, this means that the DNM mask is currently indicating that the very last bit may be subject to the event-periodic rule and are to be examined, while the other bits are not subject to the event-periodic rule and may be masked in the final mask. In some embodiments, the systems described herein may only update the do-mask mask in response to messages received at the normal interval and may not update the do-mask mask in response to event-triggered messages received outside the normal interval.

In some examples, the systems described herein may then receive another on-interval message at 1100 milliseconds that includes the content "0e ff 15." Because this message was sent at the regular interval, the systems described herein may update the do-mask mask. In this example, the inverse of the current value of the DNM mask may be "11 11 10." The bitwise AND of that value and the current value of the temp mask may be "0100 00." The inverse of that value may be "10 11 11." The bitwise AND of that value and the current state of the do-mask mask may be "10 11 11," which is also the current value of the do-mask mask. The do-mask mask would normally change to indicate any value that changes are to be masked out, but because the DNM mask indicates that last bit follows the event-periodic rule, the bitwise equation prevents the do-mask mask from being updated in a way that masks out the last bit.

In some embodiments, the systems described herein may create a final mask by taking a bitwise OR of the do-mask mask and the DNM mask. That is, any bit that is set to a "1" in either the do-mask mask or the DNM mask should be examined, but any bits that are set to "0" in both (indicating that the systems described herein have observed the bit to change but have not observed the bit to follow the event-periodic rule) are to be masked and not examined. In this example, the final mask may be "10 11 11," indicating that detection module 108 should examine every bit in the content of future messages except the second bit. In other examples, the systems described herein may mask out a greater percentage of the total message, increasing the efficiency of the systems described herein by reducing the number of bits that are examined.

In some embodiments, the systems described herein may create masks based on the frequency with which a bit, nibble, byte, and/or other portion of a message changes. For example, rather than masking out any bit that is observed to change even once, the systems described herein may only mask out bits that change in greater than 90% of the observed messages. In some embodiments, the systems described herein may increment a counter each time a portion of a message is observed to change during the observation phase and use the final counter value to determine which portions of the message are masked.

Returning to FIG. 3, at step 308, one or more of the systems described herein may determine that the message is suspicious based at least in part on the content pattern of the message and the timing pattern of the message not matching any pair of corresponding patterns in the set of corresponding patterns. For example, determination module 110 may, as part of computing device 202 in FIG. 2, determine that message 218 is suspicious based at least in part on content pattern 220 and timing pattern 222 not matching any pair of corresponding patterns in set of corresponding patterns 216.

Determination module 110 may take a variety of actions in response to determining that the message is suspicious. For example, determination module 110 may perform a security action in response to determining that the message is suspicious. In some embodiments, determination 110 may block and/or discard the message. Additionally or alternatively, determination module 110 may create a report about the suspicious message and/or inform a user and/or administrator about the suspicious message. In some embodiments, determination module 110 may initiate a search for malware and/or other attacks in response to determining that the message is suspicious. In some examples, determination module 110 may disable the functionality of one or more devices in response to determining that the message is suspicious. Additionally or alternatively, determination module 110 may activate one or more fail-safe systems (e.g., to control one or more aspects of vehicular operation) in place of a potentially compromised system. In some examples, determination module 110 may disable a CAN network and/or portions of a CAN network in response to determining that the message is suspicious.

As explained in connection with method 300 above, the systems and methods described herein may increase the security of computing systems in motor vehicles by observing the behavior of CAN messages in multiple states and types of cycles and crafting rules that account for these conditions so that legitimate messages sent in different states will not trigger false positives. Because malicious messages can interfere with vital functions such as brakes, steering, cruise control, and transmission, it is very important to be able to accurately detect malicious messages. However, discarding or blocking messages that are inaccurately marked as malicious may also cause problems, preventing legitimate instructions from reaching the brakes, steering, and so forth. Additionally, because computing systems in cars often lack the processing power of a server, desktop, or even a smartphone, it is important that any system for detecting illegitimate messages be efficient. However, detecting malicious messages without false positives may be difficult due to the various different behaviors exhibited by legitimate messages in different states or cycle types. By observing messages sent in a variety of states and crafting rules that account for different states, as well as determining which portions of a message contain useful data for identifying illegitimate messages and masking the rest, the systems described herein may identify illegitimate messages while consuming a minimum of resources and with a very low risk of false positives.

Figure 6:
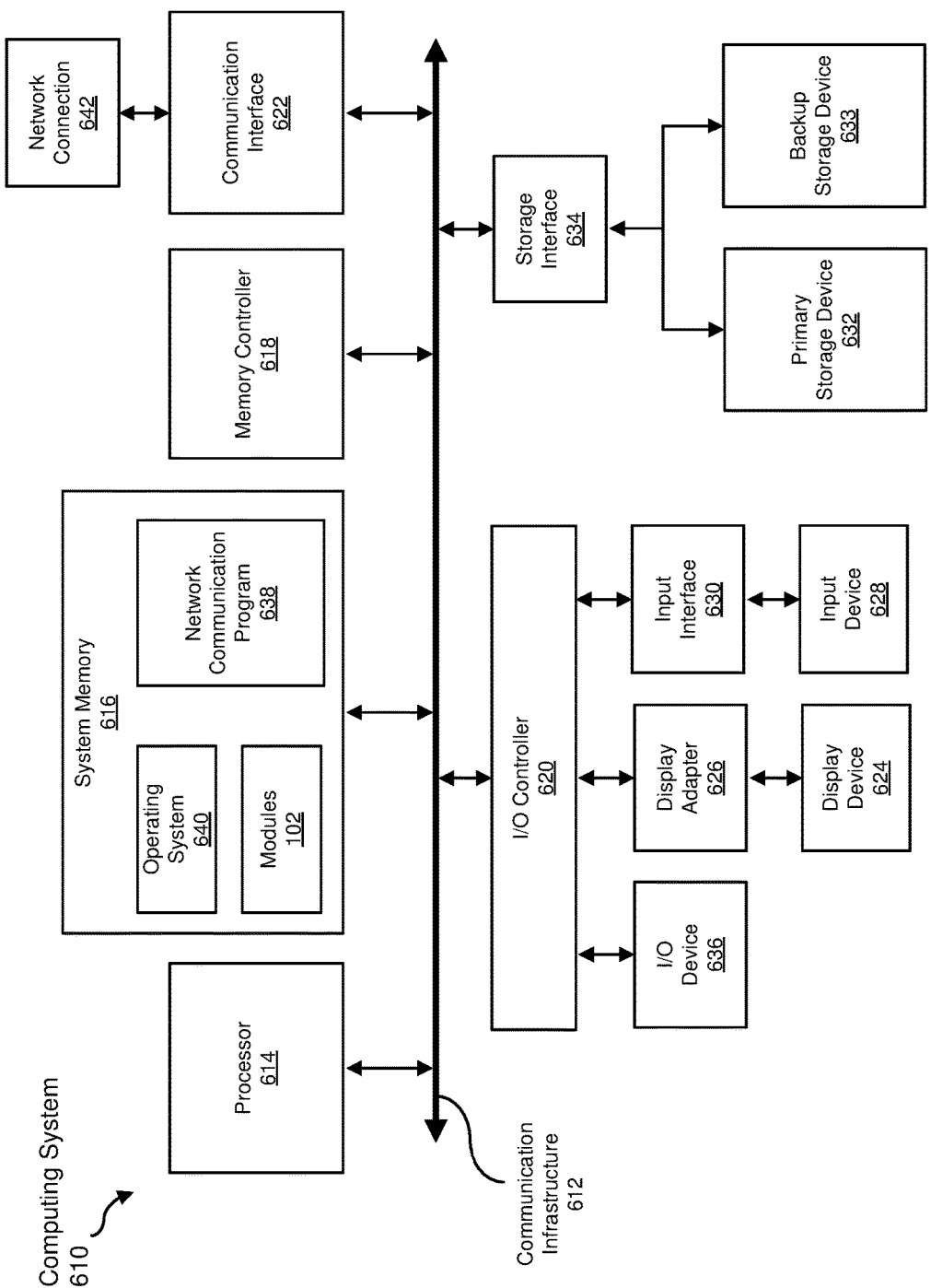
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
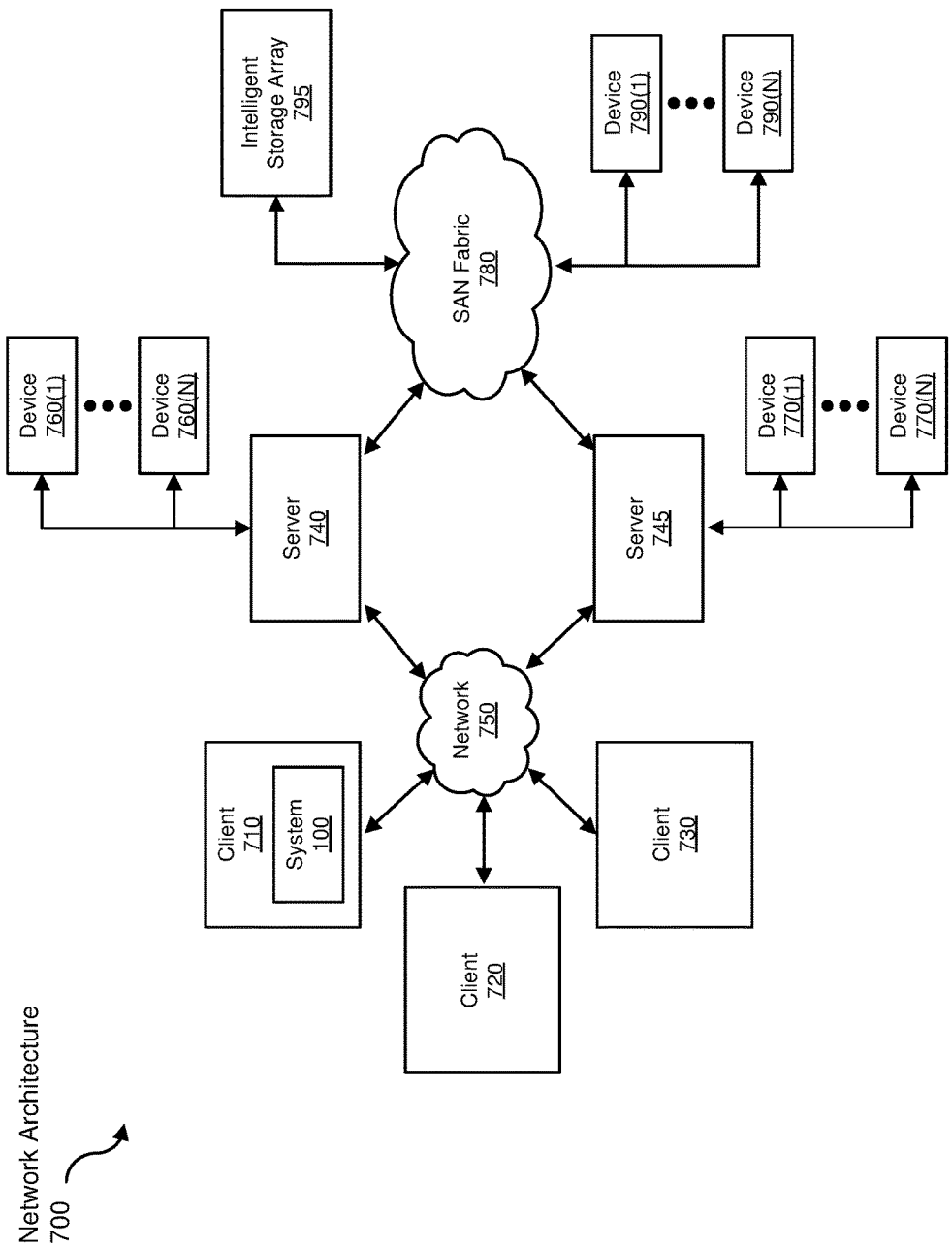
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for identifying suspicious controller area network messages.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive message data to be transformed, transform the message data into an analysis of message patterns, output a result of the transformation to a set of rules for defining patterns, use the result of the transformation to detect rule-breaking messages, and store the result of the transformation to memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying suspicious controller area network messages, at least a portion of the method being performed by a computing device comprising at least one processor, the method comprising:
    monitoring, for a predetermined period of time, messages sent by an electronic control unit that comprise a controller area network identifier for at least one controller area network device;
    observing, in the messages, a set of corresponding patterns that comprises:
        a first pair of corresponding patterns that comprises a first content pattern in the messages that corresponds to a first timing pattern of the messages; and
        an additional pair of corresponding patterns that is different from the first pair of corresponding patterns and that comprises an additional content pattern in the messages that corresponds to an additional timing pattern of the messages;
    detecting a message that comprises the controller area network identifier, wherein a content pattern of the message and a timing pattern of the message do not match any pair of corresponding patterns in the set of corresponding patterns; and
    determining that the message is suspicious based at least in part on the content pattern of the message and the timing pattern of the message not matching any pair of corresponding patterns in the set of corresponding patterns.

2. The computer-implemented method of claim 1, further comprising performing a security action in response to determining that the message is suspicious.

3. The computer-implemented method of claim 2, wherein performing the security action comprises blocking the message.

4. The computer-implemented method of claim 1, wherein:
    the first pair of corresponding patterns comprises a pair of corresponding patterns that occur in messages sent at regular intervals; and
    the additional pair of corresponding patterns comprises a pair of corresponding patterns that occur in messages sent outside of the regular intervals.

5. The computer-implemented method of claim 1, wherein:
    the first pair of corresponding patterns comprises a pair of corresponding patterns that occur in messages sent during an active state of the controller area network device; and
    the additional pair of corresponding patterns comprises a pair of corresponding patterns that occur in messages sent during an inactive state of the controller area network device.

6. The computer-implemented method of claim 1, wherein detecting the message that comprises the controller area network identifier, wherein the content pattern of the message and the timing pattern of the message do not match any pair of corresponding patterns in the set of corresponding patterns comprises:
creating a set of rules by creating, for each pair of corresponding patterns in the set of corresponding patterns, a rule that identifies messages that comprise the pair of corresponding patterns; and
detecting that the message does not adhere to any rule within the set of rules.

7. The computer-implemented method of claim 1, wherein the controller area network device monitors at least one sensor of a motor vehicle.

8. The computer-implemented method of claim 1, wherein:
each message within the messages comprises a series of bits;
observing, in the messages, the set of corresponding patterns comprises creating a mask that masks out bits in the series of bits; and
detecting the message with the content pattern and the timing pattern that do not match any pair of corresponding patterns in the set of corresponding patterns comprises monitoring, for each message, only bits in the series of bits that are not the bits masked out by the mask.

9. A system for identifying suspicious controller area network messages, the system comprising:
a monitoring module, stored in memory, that monitors, for a predetermined period of time, messages sent by an electronic control unit that comprise a controller area network identifier for at least one controller area network device;
an observation module, stored in memory, that observes, in the messages, a set of corresponding patterns that comprises:
a first pair of corresponding patterns that comprises a first content pattern in the messages that corresponds to a first timing pattern of the messages; and
an additional pair of corresponding patterns that is different from the first pair of corresponding patterns and that comprises an additional content pattern in the messages that corresponds to an additional timing pattern of the messages;
a detection module, stored in memory, that detects a message that comprises the controller area network identifier, wherein a content pattern of the message and a timing pattern of the message do not match any pair of corresponding patterns in the set of corresponding patterns;
a determination module, stored in memory, that determines that the message is suspicious based at least in part on the content pattern of the message and the timing pattern of the message not matching any pair of corresponding patterns in the set of corresponding patterns; and
at least one physical processor configured to execute the monitoring module, the observation module, the detection module, and the determination module.

10. The system of claim 9, further where the determination module performs a security action in response to determining that the message is suspicious.

11. The system of claim 10, wherein the determination module performs the security action by blocking the message.

12. The system of claim 9, wherein:
the first pair of corresponding patterns comprises a pair of corresponding patterns that occur in messages sent at regular intervals; and
the additional pair of corresponding patterns comprises a pair of corresponding patterns that occur in messages sent outside of the regular intervals.

13. The system of claim 9, wherein:
the first pair of corresponding patterns comprises a pair of corresponding patterns that occur in messages sent during an active state of the controller area network device; and
the additional pair of corresponding patterns comprises a pair of corresponding patterns that occur in messages sent during an inactive state of the controller area network device.

14. The system of claim 9, wherein the detection module detects the message that comprises the controller area network identifier, wherein the content pattern of the message and the timing pattern of the message do not match any pair of corresponding patterns in the set of corresponding patterns, by:
creating a set of rules by creating, for each pair of corresponding patterns in the set of corresponding patterns, a rule that identifies messages that comprise the pair of corresponding patterns; and
detecting that the message does not adhere to any rule within the set of rules.

15. The system of claim 9, wherein the controller area network device monitors at least one sensor of a motor vehicle.

16. The system of claim 9, wherein:
each message within the messages comprises a series of bits;
the observation module observes, in the messages, the set of corresponding patterns by creating a mask that masks out bits in the series of bits; and
the detection module detects the message with the content pattern and the timing pattern that do not match any pair of corresponding patterns in the set of corresponding patterns by monitoring, for each message, only bits in the series of bits that are not the bits masked out by the mask.

17. A non-transitory computer-readable medium comprising one or more computer-readable instructions that, when executed by at least one processor of a computing device, cause the computing device to:
monitor, for a predetermined period of time, messages sent by an electronic control unit that comprise a controller area network identifier for at least one controller area network device;
observe, in the messages, a set of corresponding patterns that comprises:
a first pair of corresponding patterns that comprises a first content pattern in the messages that corresponds to a first timing pattern of the messages; and
an additional pair of corresponding patterns that is different from the first pair of corresponding patterns and that comprises an additional content pattern in the messages that corresponds to an additional timing pattern of the messages;
detect a message that comprises the controller area network identifier, wherein a content pattern of the message and a timing pattern of the message do not match any pair of corresponding patterns in the set of corresponding patterns; and determine that the message is suspicious based at least in part on the content pattern of the message and the timing pattern of the message not matching any pair of corresponding patterns in the set of corresponding patterns.

18. The non-transitory computer-readable medium of claim 17, wherein the one or more computer-readable instructions cause the computing device to perform a security action in response to determining that the message is suspicious.

19. The non-transitory computer-readable medium of claim 18, wherein the one or more computer-readable instructions cause the computing device to perform the security action by blocking the message.

20. The non-transitory computer-readable medium of claim 17, wherein:
   the first pair of corresponding patterns comprises a pair of corresponding patterns that occur in messages sent at regular intervals; and
   the additional pair of corresponding patterns comprises a pair of corresponding patterns that occur in messages sent outside of the regular intervals.

\* \* \* \* \*